US006955797B1

(12) United States Patent
Speth

(10) Patent No.: US 6,955,797 B1
(45) Date of Patent: Oct. 18, 2005

(54) PROCESS FOR THE PREPARATION OF AMMONIA

(75) Inventor: Christian Speth, Lynge (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 09/830,478

(22) PCT Filed: Oct. 25, 1999

(86) PCT No.: PCT/EP99/08055

§ 371 (c)(1),
(2), (4) Date: Jun. 29, 2001

(87) PCT Pub. No.: WO00/26139

PCT Pub. Date: May 11, 2000

(30) Foreign Application Priority Data

Oct. 30, 1998 (DK) .............................. 1998 01398

(51) Int. Cl.[7] ................................................ C01C 1/04
(52) U.S. Cl. ....................... 423/360; 422/148; 423/361
(58) Field of Search ................................ 423/359, 360, 423/361, 362, 363; 422/148

(56) References Cited

U.S. PATENT DOCUMENTS

| | | | | |
|---|---|---|---|---|
| 1,931,678 A | | 10/1933 | F. Porter | |
| 1,952,021 A | | 3/1934 | F.C. Reed | |
| 4,744,966 A | * | 5/1988 | Grotz | 423/360 |
| 5,000,926 A | * | 3/1991 | Murayama et al. | 423/360 |
| 5,032,364 A | * | 7/1991 | Pinto | 423/361 |
| 5,152,977 A | * | 10/1992 | Zardi et al. | 423/360 |
| 5,484,582 A | * | 1/1996 | Lee | 422/148 |
| 5,520,891 A | * | 5/1996 | Lee | 252/373 |

FOREIGN PATENT DOCUMENTS

| | | |
|---|---|---|
| DE | 1066551 | 10/1959 |
| DE | 973995 | 8/1960 |
| DE | 2929300 | 1/1981 |
| GB | 1235565 | 6/1971 |
| SU | 44238 | 9/1935 |

OTHER PUBLICATIONS

Abstract of A.G. Kasatkin, "General Processes and Apparatuses in Chemical Technology", Goshimisdat, Moscow, 1961, pp. 378-379, no month.
Nielsen A. (ED.): "Ammonia catalysis and manufacture" 1995, Springer, Berlin (DE) XP002128241 p. 232 -p. 237, no month.

* cited by examiner

*Primary Examiner*—Wayne A. Langel
(74) *Attorney, Agent, or Firm*—Dickstein Shapiro Morin & Oshinsky LLP

(57) ABSTRACT

Process for the preparation of ammonia comprising steps of
contacting an ammonia synthesis gas with an ammonia synthesis catalyst arranged as reaction zone in one or more catalyst tubes;
cooling the reaction zone by heat conducting relationship with a cooling agent; and
withdrawing an ammonia rich effluent stream from the reaction zone.

5 Claims, 2 Drawing Sheets

PROCESS FOR THE PREPARATION OF AMMONIA

The present invention relates to the preparation of ammonia by catalytic conversion of ammonia synthesis gas.

More particularly, this invention concerns synthesis of ammonia at high conversion rates of ammonia synthesis gas in presence of an ammonia synthesis catalyst arranged in a tubular reaction zone being cooled by a cooling agent on shell side of the tubular reaction zone. Synthesis of ammonia from synthesis gas of hydrogen and nitrogen is an exothermic process and the process requires cooling to obtain high conversion rates.

Even if the concentration of hydrogen and nitrogen in the synthesis gas is close to the stoichiometric composition for ammonia formation, complete reaction to ammonia cannot be obtained by a single passage of the synthesis gas through a catalytic bed. Furthermore, due to the exothermic nature of the ammonia synthesis, increasing temperature during passage through the catalytic bed displaces the equilibrium concentration towards lower ammonia concentration. Several methods for cooling the ammonia synthesis process are known.

The usual methods for the preparation of ammonia from synthesis gas employ either indirect or direct cooling of the synthesis gas between a number of catalytic beds, wherein the ammonia synthesis passes over an ammonia synthesis catalyst.

By direct cooling, cold synthesis gas is introduced into partly reacted synthesis gas between the beds. The disadvantage of this cooling method is dilution of the partly reacted gas with unreacted gas resulting in lower ammonia concentration in the product stream from the process.

By the indirect cooling method, partly reacted synthesis gas is cooled by cold gas, usually fresh synthesis gas in a heat exchanger arranged between outlet and inlet of two catalyst beds.

It has now been found that conversion rate of ammonia synthesis gas to ammonia is much improved when cooling the synthesis gas as it proceeds through a catalytic bed of ammonia synthesis catalyst by heat transfer to a cooling agent being in continuous heat contact with the process.

Accordingly, this invention provides a process for the preparation of ammonia comprising steps of:

contacting an ammonia synthesis gas with an ammonia synthesis catalyst arranged as reaction zone in one or more catalyst tubes;

cooling the reaction zone continuously by transferring heat from the reaction zone to a cooling agent; and withdrawing an ammonia rich effluent stream from the reaction zone.

DETAILED DESCRIPTION OF THE PREFERRED EMBODIMENTS

In its most general embodiment, the above process is carried out in a converter with one or more catalyst tubes arranged in a shell for retaining a cooling agent. Synthesis gas is introduced at top of the catalyst tube and passed through the reaction zone of an ammonia synthesis catalyst. Heat being developed during conversion of hydrogen and nitrogen contained in the synthesis gas to ammonia is continuously transferred through wall of the catalyst tube to the cooling medium surrounding the tube. By continuous cooling of the process, an adiabatic temperature increase is substantially avoided, so that the process is carried out at substantially isothermal conditions. Isothermal conversion of the synthesis gas results in higher conversion rates of the gas to ammonia than in the known ammonia synthesis processes with indirect or direct cooling of partially reacted synthesis gas, where the cooled gas is contacted with the catalyst at adiabatic conditions. Having removed heat of reaction from the reaction zone, the cooling medium is continuously or periodically withdrawn from the converter and externally cooled by e.g. heat exchange with water or steam and recycled to the converter by conventional means.

In a specific embodiment of the invention, the cooling agent is retained in a space formed by outer wall of the catalyst tube and inner wall of a cooling tube concentrically surrounding the catalyst tube.

As an advantageous feature of the latter embodiment, shell of a reactor with a number of catalyst tubes can be avoided or made from material with considerably lower mechanical strength than in the conventional ammonia converters.

Preferably, the cooling tubes surrounding the catalyst tubes are designed with a lower mechanical strength than the catalyst tube. In case of catalyst tube rupture reacting gas escaping at high pressure into the cooling tubes, ventilates into a space outside the cooling tube. Thereby, the synthesis gas depressurizes outside the cooling tubes and detrimental reactions of the gas with the cooling agent are avoided advantageously.

Figure 1:
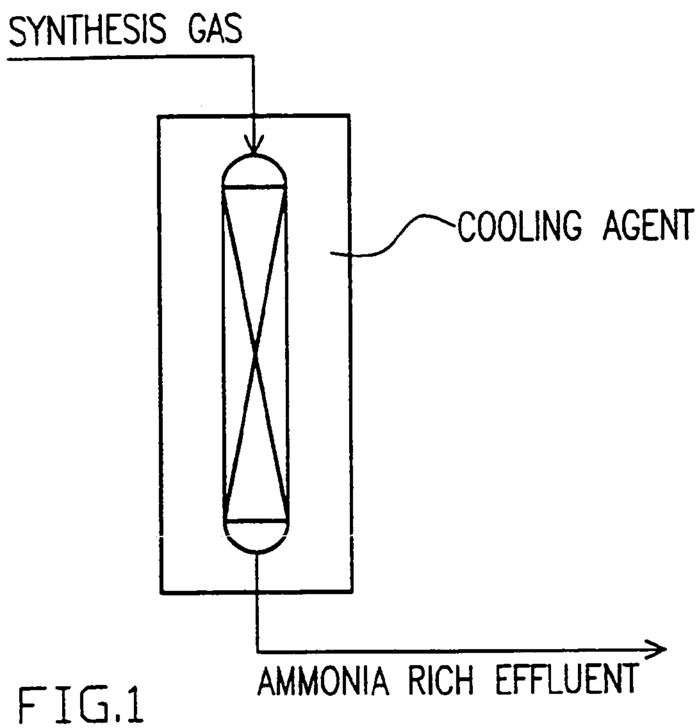
FIG. 1 illustrates a converter for the preparation of ammonia in accordance with the present invention, in which a catalyst tube for receiving the ammonia synthesis gas is disposed in a container with a cooling agent.

A further object of the invention is to provide a converter for the preparation of ammonia by reaction of ammonia synthesis gas in presence of an ammonia synthesis catalyst and cooling the reaction as it proceeds through the synthesis catalyst, the converter comprises at least one catalyst tube adapted to receive the ammonia synthesis gas and to hold a reaction zone with the ammonia synthesis catalyst, which at least one catalyst tube being arranged in a container with a cooling agent, as schematically shown in the attached FIG. 1.

Cooling media being useful as cooling agent in the above process and reactor will be any solid or liquid having a melting or boiling point below the desired temperature in the reaction zone, including salt or mixture of salts, metals or liquids being inert at the actual process conditions. Those cooling agents include eutectic mixtures of salts like mixtures of $KNO_3$, $NaNO_3$ and $NaNO_2$ (supplied by Degussa) and eutectic mixtures of NaOH and KOH. Further eutectic salt mixtures and cooling liquids are well known in the chemical industry. The usual temperature condition in the above process will be between 300° C. and 600° C. The temperature of the cooling agent has to be maintained at a predetermined level within the operation temperature range by external cooling of the agent as mentioned herein before.

Figure 2:
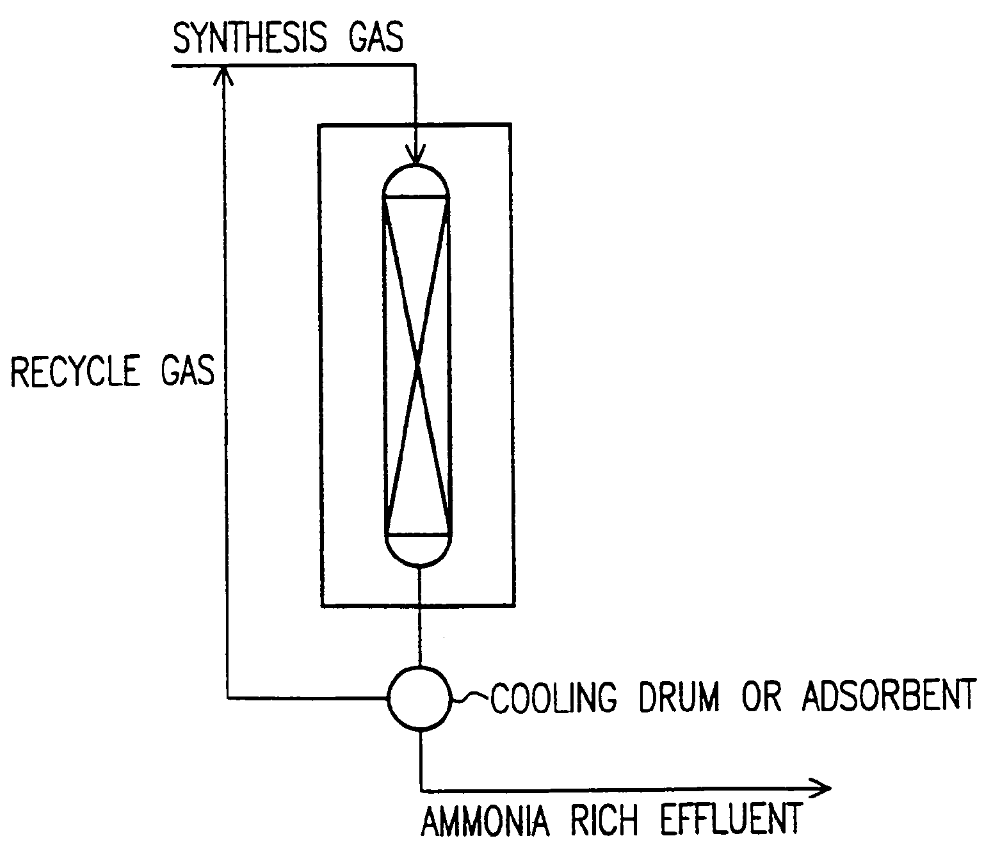
FIG. 2 is an illustration of the separation of the unreacted synthesis gas from the ammonia in the product gas and the recycling of the unreacted synthesis gas back to the catalyst tube.
Figure 3:
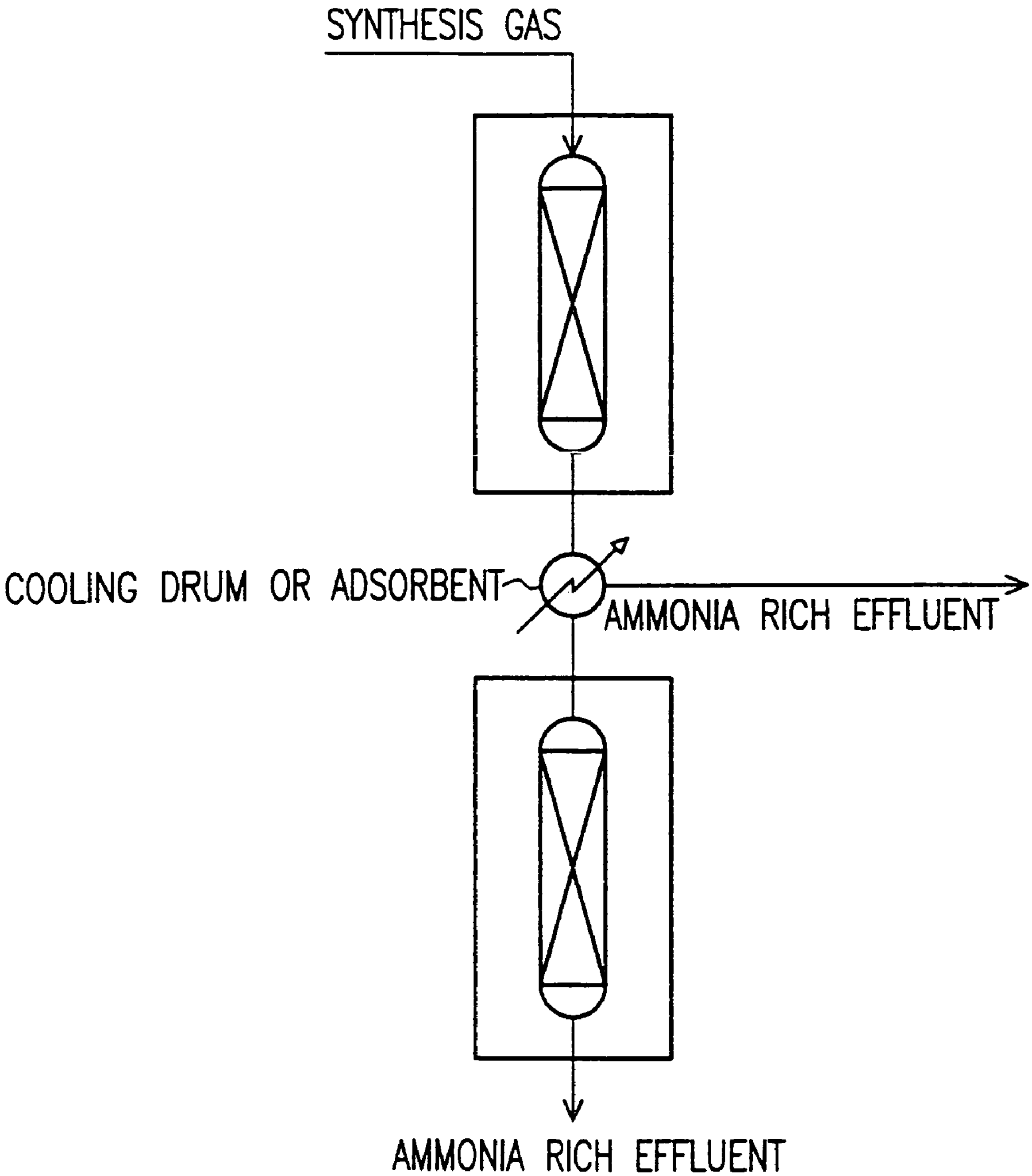
FIG. 3 is an illustration of the separation of the unreacted synthesis gas from the ammonia in the product gas, the unreacted synthesis gas then being passed to a subsequent catalyst tube for further conversion.

Removal of ammonia from the ammonia rich product gas being withdrawn from the catalyst tubes is further an embodiment of the invention obtained through adsorption on an adsorbent having high affinity to ammonia at high pressure, such as regeneration of the spent adsorbent is carried out through depressurization of the adsorbent and recovery of ammonia rich gas similar to separation of e.g. oxygen or nitrogen in the known pressure swing adsorption processes. Furthermore, ammonia may be separated from unconverted synthesis gas by cooling and condensation of ammonia in the ammonia rich effluent stream from the process. Unreacted synthesis gas being separated from ammonia in the product gas may then be recycled to the catalyst tube or passed to a subsequent catalyst tube for further conversion, as schematically shown in FIG. 2 and FIG. 3.

EXAMPLE

In a specific embodiment of the present invention a synthesis feed gas at a pressure of 13.8 MPa is preheated to 350° C. and introduced to a reactor furnished with 600 reactor tubes with an inner diameter of 80.1 mm. The tubes were loaded with an upper portion of conventional iron ammonia catalyst and a lower portion of conventional ruthenium ammonia catalyst. Synthesis gas is distributed to the tubes and reacted over the ammonia catalyst. The catalyst tubes are surrounded by a shell. In the space between the shell and the tubes, a salt melt is being circulated countercurrently to the gas flow direction inside the tubes and in heat conducting relationship with the synthesis. Circulation of the salt melt serves to remove heat evolved from the exothermic ammonia synthesis reaction. The salt melt is introduced at 360° C. into the cooling space and leaves the reactor at 420° C. The hot melt is cooled outside the reactor to 360° C. in a heat exchanger, in which the heat desorbed from the salt melt is used for preheating of synthesis gas. The cooled salt melt is then pumped back to the reactor. Having passed through the catalyst reacted synthesis gas, being rich in ammonia, leaves the tubes and is withdrawn from the reactor. The gas is cooled by heat exchange with fresh synthesis gas.

In Table 1 below are listed the concentrations of the components in the gas stream inlet and exit the reactor as obtained by the above experiment.

TABLE 1

| | Inlet gas | Exit gas |
|---|---|---|
| Composition (mole %): | | |
| $H_2$ | 73.59 | 52.95 |
| $N_2$ | 25.37 | 18.73 |
| Ar | 0.36 | 0.45 |
| $CH_4$ | 0.68 | 0.87 |

TABLE 1-continued

| | Inlet gas | Exit gas |
|---|---|---|
| $NH_3$ | | 27.00 |
| Pressure, MPa | | 13.4 |
| Temperature, ° C. | 13.8 | 402 |
| | 350 | |

The inventive process may be employed in a one through ammonia synthesis section as well as in a more conventional type ammonia synthesis loop section or in combination with similar or other ammonia converter types in more advanced ammonia synthesis loop sections e.g. comprising feed gas converters and/or purge gas converters. The ammonia product may be retrieved from the ammonia rich product gas in the synthesis section by cooling and condensation of ammonia in the ammonia rich effluent stream or absorption. The removal of ammonia may be conducted in one or more stages, between and/or after each of the reaction zones.

What is claimed is:

1. A process for the preparation of ammonia comprising the steps of:

contacting an ammonia synthesis gas with an ammonia synthesis catalyst arranged as a reaction zone in one or more catalyst tubes;

cooling the reaction zone by a heat conducting relationship with a cooling agent; and withdrawing an ammonia rich effluent stream from the reaction zone;

wherein the cooling agent is selected from the group consisting of metals having a melting point below the temperature in the reaction zone, and wherein the cooling agent is circulated within cooling tubes, each cooling tube concentrically surrounding one of said catalyst tubes.

2. The process of claim 1, wherein the ammonia synthesis gas is contacted with the ammonia synthesis gas arranged in two or more reaction zones with intermediate withdrawal of an ammonia rich effluent stream between the reaction zones.

3. The process of claim 1, wherein the ammonia rich effluent stream is separated into a stream of unconverted ammonia synthesis gas and an ammonia product stream, the unconverted ammonia synthesis gas is recycled to the reaction zone.

4. The process of claim 2, wherein the separation is obtained by cooling of the effluent stream and condensation of ammonia.

5. The process of claim 2, wherein the separation is obtained by adsorption of ammonia contained in the effluent stream.

* * * * *